United States Patent [19]

Usui

[11] 4,002,715
[45] Jan. 11, 1977

[54] METHOD FOR PRODUCING A TAPERED PIPE OF REINFORCED SYNTHETIC RESIN

[76] Inventor: Fumio Usui, No. 441, Shimo Asao, Tama, Kawasaki, Kanagawa, Japan

[22] Filed: Jan. 6, 1975

[21] Appl. No.: 538,773

Related U.S. Application Data

[63] Continuation of Ser. No. 280,209, Aug. 14, 1972, abandoned.

[52] U.S. Cl. .............................. 264/250; 264/257; 264/259; 264/295; 264/311; 264/313; 264/331; 264/339
[51] Int. Cl.[2] ...................... B29C 5/04; B29D 3/02; B29D 23/00
[58] Field of Search .......... 264/250, 310, 311, 318, 264/334, 336, 259, 339, 295, 313, 331; 156/189, 194, 173; 425/DIG. 58; 249/184, 186

[56] References Cited

UNITED STATES PATENTS

| | | | |
|---|---|---|---|
| 2,728,127 | 12/1955 | Armstrong | 425/DIG. 58 |
| 2,783,174 | 2/1957 | Stephens | 264/311 |
| 2,785,442 | 3/1957 | Boggs | 264/311 |
| 3,379,591 | 4/1968 | Bradley | 156/173 |
| 3,697,346 | 10/1972 | Van Dorn et al. | 156/172 |
| 3,775,207 | 11/1973 | Harmon | 156/173 |

OTHER PUBLICATIONS

Randolph et al, Plastics Engineering Handbook, Reinhold, N.Y. (1960) pp. 297–299 Relied on.

*Primary Examiner*—Willard E. Hoag
*Attorney, Agent, or Firm*—Wenderoth, Lind & Ponack

[57] ABSTRACT

A tapered synthetic resin pipe can be produced by winding belt-like or thread-like glass fiber around a tapered core bar, inserting it into a tapered mold and thereafter pulling out only the core bar, pouring a thermosetting synthetic resin in liquid form into the mold, inclining the mold by a predetermined angle from the horizontal position and rotating it at a predetermined rate of rotation.

1 Claim, 18 Drawing Figures

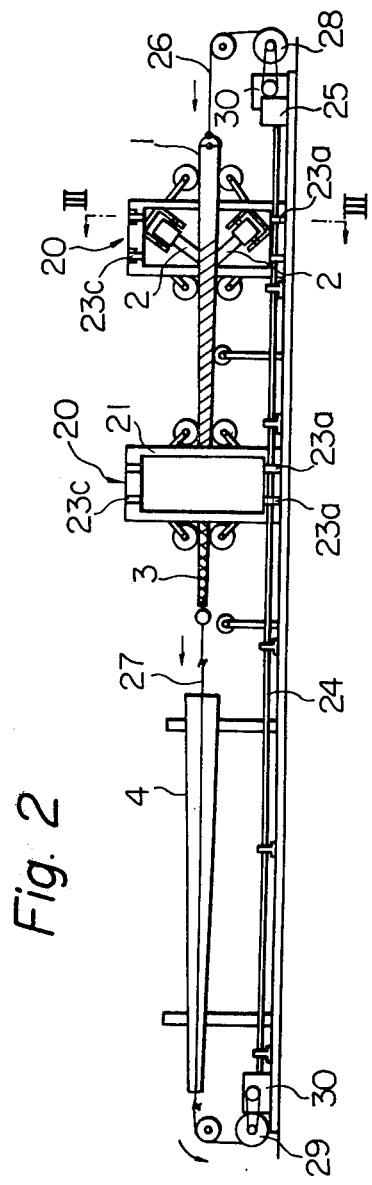
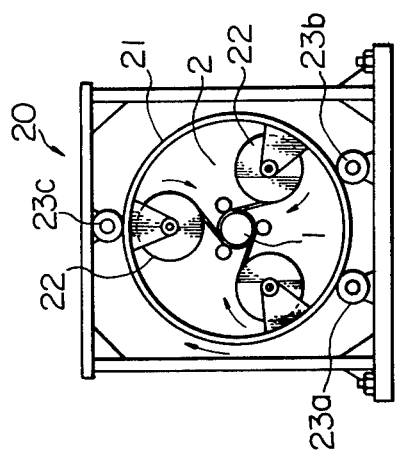
Fig. 2
Fig. 3

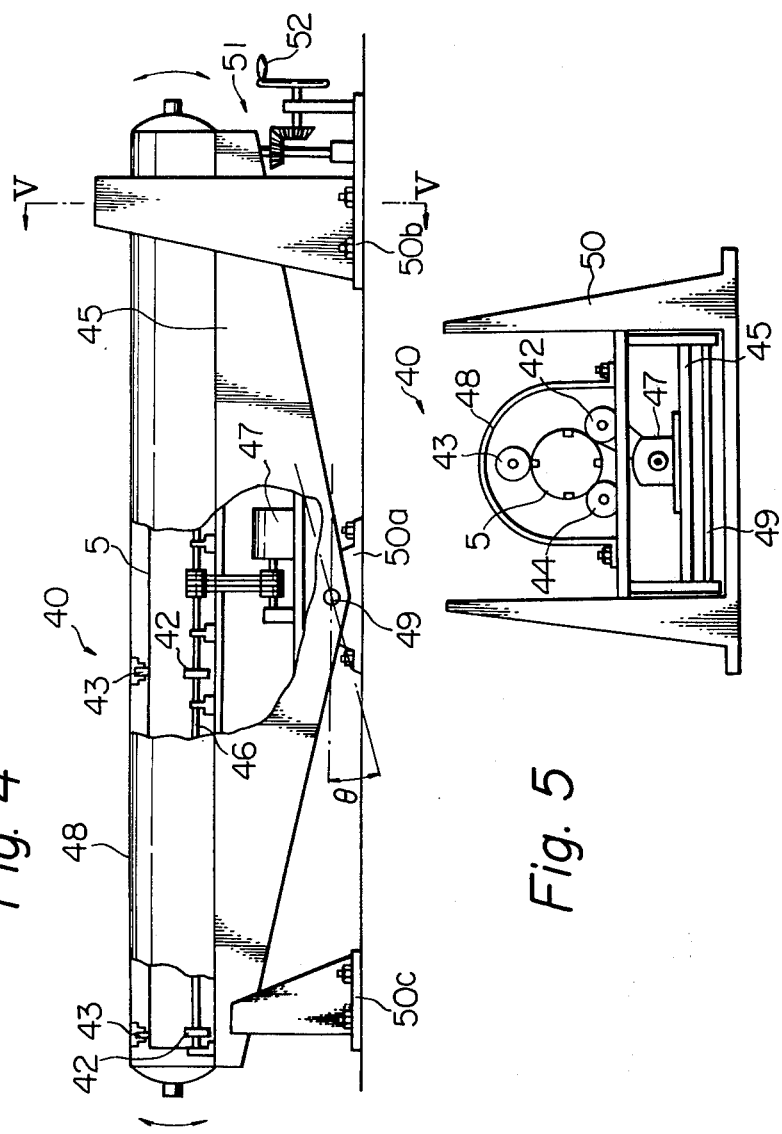

METHOD FOR PRODUCING A TAPERED PIPE OF REINFORCED SYNTHETIC RESIN

This is a continuation of application Ser. No. 280,209 filed Aug. 14, 1972, now abandoned.

BACKGROUND OF THE INVENTION

The present invention relates to a method for producing a tapered pipe of reinforced synthetic resin, and more particularly, to a method for producing a tapered pipe of synthetic resin reinforced by fiber material, wire material or combination thereof.

Conventionally, tapered pipes of reinforced synthetic resin have been produced by winding glass fibers containing synthetic resin in semi-solid state around a tapered core bar in multi-layers and allowing them to harden. However, this method has disadvantages that additional steps are needed in finishing the surface of a tapered pipe and that the strength is non-uniform due to irregular impregnation of the synthetic resin. Further, when it is required to make the thickness at the extreme end of the tapered pipe different from that at the root thereof, the winding of the glass fiber layers around the pipe must be regulated. Thus, it has been difficult to provide a tapered pipe of reinforced synthetic resin of good quality by the conventional method which requires relatively much troubles and time.

SUMMARY OF THE INVENTION

An object of the present invention is to provide a simple and economical method for producing a tapered pipe of reinforced synthetic resin of high quality.

The method according to the present invention can produce a tapered pipe of reinforced synthetic resin by winding belt-like or thread-like glass fiber around a tapered core bar, inserting it into a tapered mold and thereafter pulling out only the core bar, inserting the mold into a body of rotation, pouring a thermosetting synthetic resin in liquid form into the mold, inclining the mold by a predetermined angle from the horizontal position and rotating it at a predetermined rate of rotation.

The method according to the present invention can produce a tapered pipe of reinforced synthetic resin with a base plate by fixing a base frame for a base plate to an end of the tapered core bar having a larger diameter than the other end and repeating the above steps.

The method according to the present invention can further produce a tapered bent pipe of reinforced synthetic resin by winding belt-like or thread-like glass fiber around a tapered core bar, inserting it into a tapered flexible mold and thereafter pulling out the core bar only, inserting the mold into a body of rotation, pouring a thermosetting synthetic resin in liquid form into the mold, inclining said body of rotation by a predetermined angle from the horizontal position and rotating it at a predetermined rate of rotation, removing the flexible mold from the body of rotation before the thermosetting synthetic resin has hardened, and bending it in a predetermined form and fixing it in a jig.

BRIEF DESCRIPTION OF THE DRAWINGS

The invention will be better understood from the following description taken in connection with the accompanying drawings in which:

FIG. 2 shows a schematic construction of a fiber winding apparatus which is used for practicing the method of the present invention;

FIG. 3 is a side sectional view taken along the line III—III of FIG. 2;

FIG. 4 shows a schematic construction of a rotating apparatus which is used for practicing the method of the present invention;

FIG. 5 is a side sectional view taken along the line V—V of FIG. 4;

DETAILED DESCRIPTION OF THE INVENTION

Figure 1A:
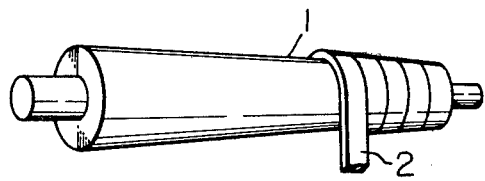
FIGS. 1A – 1F schematically illustrate the steps of production of a tapered pipe of reinforced synthetic resin according to the present invention.
Figure 1B:
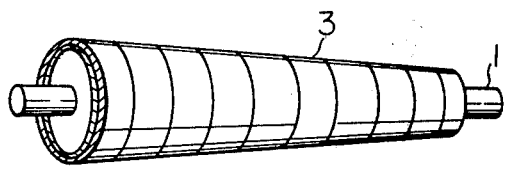
Figure 1C:
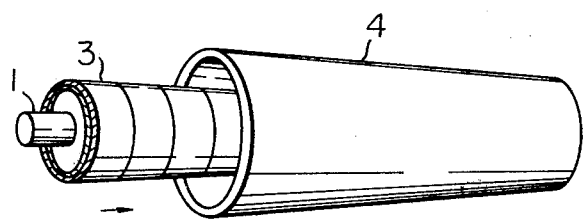
Figure 1D:
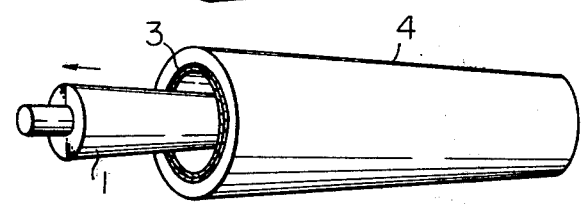
Figure 1E:
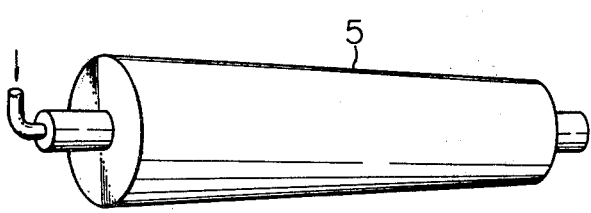

The method of the present invention is described hereunder with reference to the accompanying drawings.

As shown in FIG. 1, the method for producing a tapered pipe comprises the steps of: winding reinforcing material 2 (for example, belt-like glass fibers, threads, or combination thereof) spirally in a number of layers around a core bar 1 having a predetermined taper to form a body 3 of the reinforcing material in the predetermined shape (FIGS. 1A and 1B), inserting the core bar 1 having the body 3 of the reinforcing material into a mold 4 having a predetermined taper (FIG. 1C), pulling out the core bar 1 only, leaving the body 3 in the mold 4 (FIG. 1D), inserting the mold 4 in which the body 3 of the reinforcing material is inserted into a body of rotation 5 and pouring a predetermined amount of a thermosetting synthetic resin in liquid form into the mold 4 (FIG. 1E), inclining the body of rotation 5 by a predetermined angle from the horizontal position with the end of the mold 4 having the smaller diameter downward and rotating the body of rotation at a predetermined rate of rotation (FIG. 1F), and pulling out the hardened and formed pipe from the mold 4 (this step is not shown).

The core bar 1 may be a metallic taper roll of common use, and it is preferable that a plurality of pins are retractably provided on the surface of the roll to prevent slipping off of the glass fibers or threads. Conventional thread winding machine can be used for winding the reinforcing material around the core bar 1.

The mold 4 may be a common metallic tapered pipe, however, since it is rotated at a high speed it is preferably made from material as light as and as strong as possible, such as aluminum, duralumin, reinforced synthetic resin, etc.

The materials which can be used as the thermosetting synthetic resin are unsaturated polyester resin, epoxy resin, phenolformaldehyde resin, melanineformaldehyde resin, and polyimide resin. The strength of the tapered pipe can be increased by mixing finely crushed aggregates with such synthetic resins.

Any rotating apparatus which will support a long body of rotation in a somewhat inclined position with respect the horizontal direction and to rotate it is sufficient. Accordingly, conventional lathe or machines similar thereto can be used. Particularly, it is preferable that such machine is provided with a mechanism for controlling the rate of rotation and for vertical control of the table supporting the body of rotation thereon.

An example of the apparatus for practicing the present invention is described hereunder with reference to FIGS. 2 – 5. FIGS. 2 and 3 show a schematic construction of the fiber winding apparatus. A plurality of winding units 20 (only two units are shown in the illustrated embodiment) are disposed in series and the core bar 1 is inserted through the center thereof. The winding unit 20 comprises a rotary drum 21 and reinforcing material supporting reels 22 attached to the inner surface of the drum and is rotatably supported by rollers 23a, b, and c. The rollers 23a are fixed to a shaft 24 which is driven by a motor 25. When the shaft 24 is driven, the rollers 23a cause the rotary drum 21 to rotate in the arrowed direction so that the reinforcing materials 2 supported on the reels 22 are wound around the core bar 1.

At the both ends of the core bar 1 ropes 26, 27 are fastened. An end of the rope 26 is wound around a reel 28 while an end of the rope 27 is wound around another reel 29 passing through the mold 4. The reels 28 and 29 are driven by the motor 25 through a suitable gear box 30.

During the winding operation of the reinforcing materials 2, the core bar 1 is not rotated but pulled by the rope 27 to slowly move in the arrowed direction (in FIG. 2 to the left). Accordingly, the reinforcing materials 2 are spirally wound around the core bar 1. The core bar 1 completely wound with the reinforcing materials is pulled strongly by the rope 27 into the mold 4. As a result, the body 3 formed with the reinforcing materials is brought into a close contact with the inner surface of the mold 4. Pins (not shown) provided on the roll surface of the core bar 1 are retracted therewithin and the core bar 1 is pulled back by the rope 26 to the right in FIG. 2 until it returns to its initial position leaving the body 3 formed with the reinforcing materials within the mold 4.

After the rope 27 is removed from the mold 4, the mold 4 is mounted to the rotating apparatus described below.

FIGS. 4 and 5 show the schematic construction of the rotating apparatus. The rotating apparatus 40 supports the long pipe-like body of rotation 5 in a horizontal position. The body of rotation 5 is rotatably supported by rollers 42, 43 and 44. The rollers 42 are fixed to a shaft 46 which is driven by a motor 47 through a suitable transmission (not shown). The shaft 46 and the motor 47 are mounted on a supporting bedplate 45 which is provided with a cover 48 for covering the body of rotation 5.

The supporting bedplate 45 is pivotally supported at a fulcrum 49 by a bed 50a. The right end of the supporting bedplate 45 is supported by a bed 50b so as to prevent it from swinging sideways and also is supported by a lead screw mechanism 51 so as to be movable vertically. The left end of the supporting bedplate 45 is supported by a bed 50c so as to prevent it from swinging sideways. By rotating a handle 52 of the lead screw mechanism 51, the supporting bedplate 45 can be swung clockwise or anticlockwise about the fulcrum 49.

To operate the rotating apparatus 40, firstly an end of each of the mold 4 and the body of rotation 5 (for example, the end of the mold 4 having the smaller diameter) is sealed by a suitable cover (not shown), the handle 52 is turned so that the other end of each of the mold 4 and the body of rotation 5 (for example, the end of the mold 4 having the larger diameter) is elevated to a suitable angle, and a thermosetting synthetic resin in liquid form is poured into the other end which is thereafter sealed by a suitable cover (not shown). Then, the motor 47 is started and the transmission (not shown) and the handle 52 are adjusted to establish the desired values of the rate of rotation of the body of rotation 5 and the angle ($\theta$) thereof with respect to the horizontal position.

There are many different methods for pouring the synthetic resin into the mold the simplest of which is to pour the resin directly into the mold from the vessel. After the resin is poured, the body of rotation containing the mold is swung vertically while rotating slowly to accelerate distribution of the resin. When the tapered pipe is relatively short (2 – 5 m), a spray nozzle may be attached to the extreme end of the pipe so that the nozzle spraying the synthetic resin is moved within the mold rotating in a low speed.

Experiments have shown that when the body of rotation 5 is rotated with the central axis thereof maintained horizontally the synthetic resin within the body of rotation 5 has a tendency to move toward the end having a larger inner diameter. This tendency increases as the rate of rotation increases. Accordingly, the tapered pipe thus produced has a thickness which is thicker in the portion having the larger inner diameter and becomes thinner as the inner diameter becomes smaller.

In order to produce a tapered pipe having a uniform thickness, the central axis of the body of rotation 5 must be inclined by an angle $\theta$ so that the end of the body having a larger inner diameter is higher in altitude than the other end. This angle of inclination $\theta$ is experimentally determined by the length of the pipe, the taper angle, the structure of the reinforcing material, the viscosity of the synthetic resin, and the rate of rotation. An experimental equation generally expressing the relationship will become clear through a number of experiments. A limited number of experiments have shown that the pipe length, the taper angle $\alpha$ (namely the cone angle), and the rate of rotation n are the main parameters to determine the angle of inclination $\theta$.

Figure 6A:
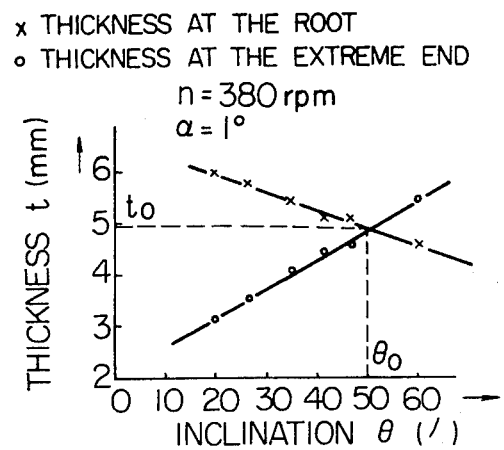
FIGS. 6A – 6C are graphs showing the relationship between the rate of rotation and the angle of inclination of the body of rotation and the thickness of the synthetic resin pipe.
Figure 6B:
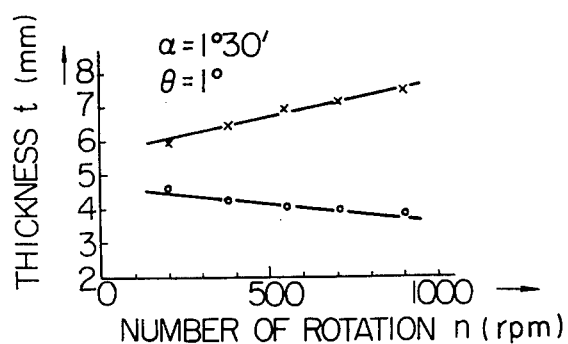
Figure 6C:
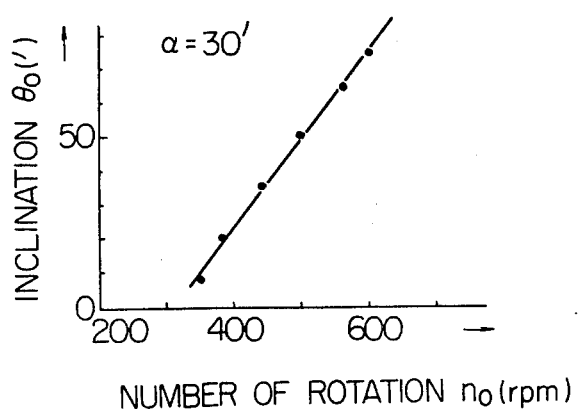

FIGS. 6A – 6C show the experimental results on the relationship of the taper angle $\alpha$, the rate of rotation n, the angle of inclination $\theta$, and the pipe thickness t.

As shown in FIG. 6A, when the taper angle $\alpha$ and the rate of rotation n are kept constant, as the angle of inclination $\theta$ increases the thickness of the tapered pipe has the tendency to increase at the extreme end and decrease at the root. Accordingly, the intersection P of the curves R and E shows that the extreme end and the root are equal in thickness. At this time, the optimum angle of inclination is $\theta o$ and the optimum thickness of the pipe is to.

As shown in FIG. 6B, when the taper angle $\alpha$ and the angle of inclination $\theta$ are kept constant, as the rate of rotation n increases the thickness of the tapered pipe has the tendency to decrease at the extreme end and increase at the root. From this fact, it can be inferred that there exists the optimum rate of rotation No to make the thickness of the pipe equal at the extreme end and at the root.

FIG. 6C shows the relation between the optimum rate of rotation No and the optimum angle of inclination $\theta o$ to make the thickness of the pipe equal at the extreme end and at the root when the taper angle $\alpha$ is kept constant. FIG. 6C shows also that when the rate of rotation increases the angle of inclination must be increased also.

It is widely known that centrifugal force is in proportion to the square of the rate of rotation and to the radius of rotation. Accordingly, it is clear that the increase in the rate of rotation causes the increase in the centrifugal force whereby the synthetic resin sufficiently permeates the reinforcing material. Conversely, however, when the rate of rotation is decreased, the centrifugal force is also decreased to lessen the permeability of the resin into the reinforcing material to form bubbles therein. This tendency increases toward the portion of the pipe having smaller diameter. The experimental results show that no bubble is formed in the product when the peripheral speed of the portion having the smallest diameter is 350 meters per minute or greater than that.

As described above, the thickness of the tapered pipe can be adjusted as required by regulating the layers of the reinforcing material or by regulating the angle of inclination $\theta$ of the central axis of the body of rotation or the rate of rotation No of the body of rotation.

When used as an electric pole, a pole for supporting lights, a pole for supporting advertising board, a mast of yacht, a flagpole, or other support poles, the root of the reinforced synthetic resin pipe must be fixed on a base. In order to facilitate this fixing work, a base plate may be preformed integrally with the pipe of the reinforced synthetic resin.

Figure 7:
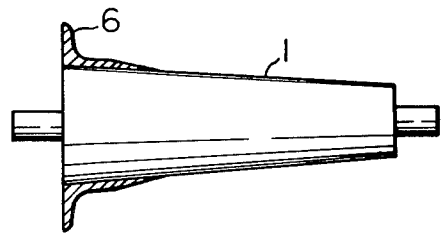
FIGS. 7 – 10 are schematic illustrations of a part of the steps of production of a tapered pipe of reinforced synthetic resin with a base plate according to the present invention.
Figure 8:
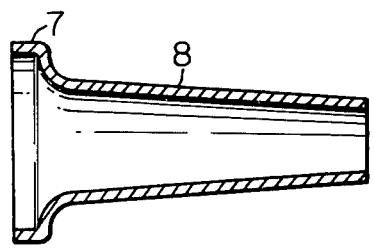

Accordingly, in order to produce a pipe of reinforced synthetic resin with a base plate like this, a base frame 6 for the base plate is attached at the end of the core bar 1 having the larger diameter as shown in FIG. 7. The flanged base frame is mounted by relative movement thereof with respect to the tapered core bar from the narrow end of the core bar toward the large diameter end of the core bar. Then, the reinforcing material 2 is wound around the core bar 1 as described above (see FIG. 1A), the core bar 1 is inserted into a mold 8 having an enlarged end 7 to receive the base plate portion (FIG. 8), thereafter the above described steps are repeated.

Figure 9:
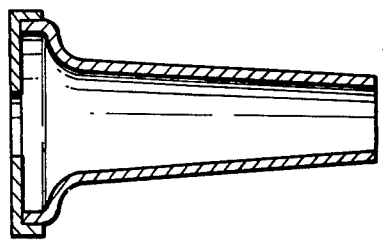
Figure 10:
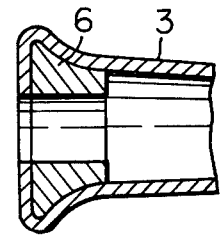

The base frame 6 for the base plate may be of metallic material and may be taken away after the base plate is formed, or may be of such materials as glass fiber or independent foamed material so as to remain within the pipe after the forming of the base plate. When a mold having, for example, a bottom plate as shown in FIG. 9 is used, the base frame 6 can be left within the body 3 of the reinforcing material as shown in FIG. 10 by bending the reinforcing material 2 so as to cover the bottom of the base frame 6.

Figure 11:
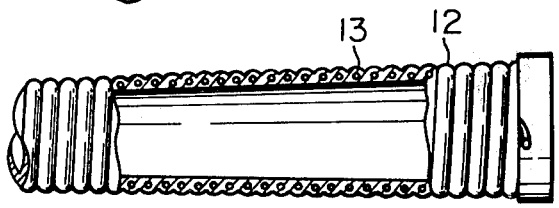
FIG. 11 is a schematic illustration of a part of the steps of production of a tapered bent pipe of reinforced synthetic resin according to the present invention.

In using the pole for supporting a light or advertising board, it is frequently necessary that the top of such pole be bent. In order to produce such a bent pipe, a flexible mold 12 as shown in FIG. 11 is used. The flexible mold 12 is formed of a flexible material, such as rubber, synthetic resin, or rubber cloth, having rigid metallic wires 13, such as piano wires, embedded therewithin. The flexible mold 12 has the same function as the mold 4 described in connection with FIG. 1. It is preferable to provide a suitable support means since the flexible pipe 12 sometimes deflects during the insertion or removal of the core bar 1.

Figure 1F:
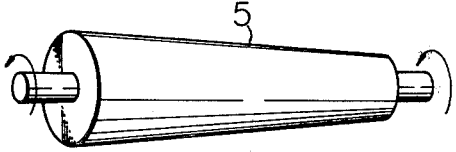

As described in connection with FIG. 1F, the flexible mold 12 is inserted within the body of rotation 5 and this assembly is rotated, before the liquid synthetic resin is permeated in the body 3 of the reinforcing material sufficiently and uniformly and is hardened sufficiently, the flexible mold 12 is taken out from the body of rotation 5 and is fixed with a suitable deformation by a jig (not shown). After the synthetic resin is hardened, the flexible mold 12 is removed from the jig, and the bent pipe thus hardened and formed is taken out from the flexible mold 12. This bent pipe also can be provided with the base plate described above.

Since the present invention utilizes centrifugal force due to rotation, the synthetic resin is distributed uniformly on the surface of the tapered pipe and no surface finishing step is required. When a pigment having a larger specific gravity is mixed in the synthetic resin, the pigment will be permeated by the centrifugal force through the pipe up to the surface thereof to uniformly color the surface. Further, when the inner surface of the mold is provided with engravings of patterns, the reinforcing material is deformed by the engraved patterns and, accordingly, a tapered pipe or a tapered bent pipe of reinforced synthetic resin having various patterns or a base plate can be produced.

While there has been described and illustrated a present preferred method of practicing the invention it is to be distinctly understood that the invention is not limited thereto but may be otherwise variously practiced within the scope of the following claims.

What we claim is:

1. A method of manufacturing a tapered pipe of reinforced synthetic resin material with a base plate integrally attached to the larger end thereof, said method comprising:
    providing a tapered core bar having a first larger diameter end and a second smaller diameter end;
    mounting a flanged base frame on said first end of said core bar, thereby forming a core bar assembly;
    spirally winding glass fiber reinforcing material in plural layers over said core bar and said base frame, thereby forming a body of reinforcing material of predetermined shape;
    inserting said core bar assembly with said body of reinforcing material thereon into a rigid one-piece mold having an interior configuration in the form of a tapered portion and, at the larger end thereof, an enlarged portion for receiving said base frame;
    extracting said core bar from said mold while leaving said body of reinforcing material and said base frame in said mold;
    bending a portion of said body of reinforcing material to cover an outer bottom portion of said base frame;
    inserting said mold having said body of reinforcing material and said base frame therein within a body of rotation;
    pouring a predetermined amount of liquid thermosetting synthetic resin material into said mold;
    inclining said mold and body of rotation from the horizontal position by a predetermined angle so that the larger end of the mold is higher than the smaller end;
    rotating said mold and body of rotation at a predetermined rate of rotation while so positioned, thereby causing said resin material to permeate said body of reinforcing material, and causing said resin material to harden in said body of reinforcing material, thereby forming a tapered pipe having a base plate integral with the larger diameter end thereof; and axially removing said tapered pipe and integral base plate from said mold.

* * * * *